(12) United States Patent
Gray et al.

(10) Patent No.: US 12,250,612 B1
(45) Date of Patent: Mar. 11, 2025

(54) SYSTEM AND METHOD FOR DETERMINING PHYSICAL LOCATIONS OF ADDRESSES

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/631,924

(22) Filed: Apr. 10, 2024

Related U.S. Application Data

(63) Continuation of application No. 17/521,497, filed on Nov. 8, 2021, now Pat. No. 11,968,595, which is a
(Continued)

(51) Int. Cl.
*G01S 5/02* (2010.01)
*G06F 16/29* (2019.01)
(Continued)

(52) U.S. Cl.
CPC ............ *H04W 4/029* (2018.02); *G06F 16/29* (2019.01); *G06F 16/9537* (2019.01);
(Continued)

(58) Field of Classification Search
CPC ..... H04W 4/029; H04W 4/021; H04W 4/023; H04W 4/025; H04W 64/003; G06F 16/9537; G06F 16/29; H04L 67/52
See application file for complete search history.

(56) References Cited

U.S. PATENT DOCUMENTS

| | | |
|---|---|---|
| 8,200,247 B1 | 6/2012 | Starenky et al. |
| 9,165,206 B2 | 10/2015 | Corpet et al. |

(Continued)

OTHER PUBLICATIONS

IP.com search history (Year: 2024).*
ProQuest search history (Year: 2024).*

*Primary Examiner* — Moustapha Diaby
(74) *Attorney, Agent, or Firm* — Fletcher Yoder, P.C.

(57) ABSTRACT

A method of determining a physical location for an address. The method includes receiving from a first global positioning system on a vehicle a first set of global positioning data indicative of a vehicle location. The method may also receive from a second global positioning system on a portable electronic device a second set of global positioning data indicative of a portable electronic device location. The method may also receive a set of location metadata associated with a picture. The method determines a residence location from the first set of global positioning data, the second set of global positioning data, or the set of location metadata. The method then associates the physical location to the address.

20 Claims, 4 Drawing Sheets

Related U.S. Application Data continuation of application No. 16/815,178, filed on Mar. 11, 2020, now Pat. No. 11,197,127.

(60) Provisional application No. 62/818,545, filed on Mar. 14, 2019.

(51) Int. Cl.
| | |
|---|---|
| *G06F 16/9537* | (2019.01) |
| *H04L 67/52* | (2022.01) |
| *H04W 4/02* | (2018.01) |
| *H04W 4/021* | (2018.01) |
| *H04W 4/029* | (2018.01) |
| *H04W 64/00* | (2009.01) |

(52) U.S. Cl.
CPC ............ *H04L 67/52* (2022.05); *H04W 4/021* (2013.01); *H04W 4/023* (2013.01); *H04W 64/003* (2013.01)

(56) References Cited

U.S. PATENT DOCUMENTS

| | | |
|---|---|---|
| 2010/0303286 A1 | 12/2010 | Kim |
| 2015/0310556 A1 | 10/2015 | Kiper et al. |
| 2016/0119554 A1 | 4/2016 | Matsuhashi |
| 2017/0011113 A1* | 1/2017 | Sparrow ............ G06Q 30/0246 |
| 2018/0035074 A1 | 2/2018 | Barnes, Jr. |
| 2019/0037358 A1* | 1/2019 | Jenkins .............. H04L 61/5007 |
| 2019/0068551 A1 | 2/2019 | Bilsten |
| 2019/0132563 A1 | 5/2019 | Wang |
| 2019/0212977 A1* | 7/2019 | Sicurelli, III ............. G06F 7/08 |
| 2019/0251352 A1* | 8/2019 | Hovden .................. G06T 3/153 |

\* cited by examiner

SYSTEM AND METHOD FOR DETERMINING PHYSICAL LOCATIONS OF ADDRESSES

CROSS-REFERENCE TO RELATED APPLICATION

This application is a continuation application claiming priority to and the benefit of U.S. non-provisional application Ser. No. 17/521,497, entitled "SYSTEM AND METHOD FOR DETERMINING PHYSICAL LOCATIONS OF ADDRESSES," filed Nov. 8, 2021, which is a continuation application claiming priority to and the benefit of U.S. non-provisional application Ser. No. 16/815,178, entitled "SYSTEM AND METHOD FOR DETERMINING PHYSICAL LOCATIONS OF ADDRESSES," filed Mar. 11, 2020, which claims priority to and the benefit of U.S. provisional application No. 62/818,545, entitled "SYSTEM AND METHOD FOR DETERMINING PHYSICAL LOCATIONS OF ADDRESSES," filed Mar. 14, 2019, each of which is hereby incorporated by reference in its entirety for all purposes.

BACKGROUND

The present disclosure relates generally to determining physical addresses.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Mailing addresses in rural areas do not always reflect the actual physical location of the address. For example, some rural addresses may be associated on a map with the middle of a county or the first house on a shared street. Without the actual physical location of a residence, an institution may struggle in delivering documents to its members, delivering emergency services, and/or making property assessments.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method of determining a physical location for an address. The method includes receiving from a first global positioning system on a vehicle a first set of global positioning data indicative of a vehicle location. The method may also receive from a second global positioning system on a portable electronic device a second set of global positioning data indicative of a portable electronic device location. The method may also receive a set of location metadata associated with a picture. The method determines the physical location of the address from the first set of global positioning data, the second set of global positioning data, or the set of location metadata. The method then associates the physical location to the address.

In another embodiment, a method of determining a physical location for an address. The method includes receiving from a global positioning system on a portable electronic device a set of global positioning data indicative of a portable electronic device location. The method associates the set of global positioning data to specific times. The method may determine where the portable electronic device location is in the evening using the set of global positioning data. The method may also determine where the portable electronic device location is on the weekend using the set of global positioning data. The method may also request identification of the current portable electronic device location. The method associates the portable electronic device location with a residence address.

In another embodiment, a method of determining a physical location for an address. The method includes receiving from a global positioning system on a vehicle a set of global positioning data indicative of a vehicle location. The method associates the set of global positioning data to specific times. The method may determine where the vehicle is in the evening using the set of global positioning data. The method may also determine where the vehicle is on the weekend using the set of global positioning data. The method may also determine where the vehicle is most inactive using the set of global positioning data. The method associates the vehicle location with a residence address.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
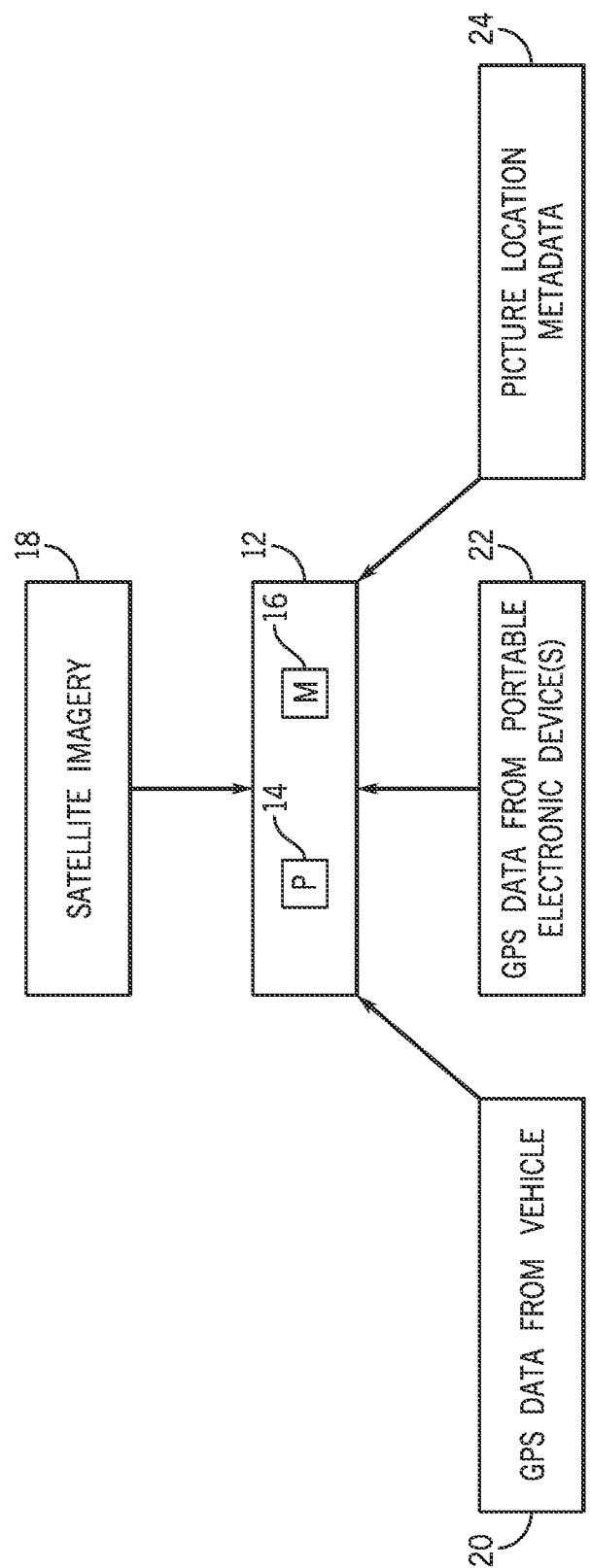
FIG. 1 is a schematic view of an address location identifier system, in accordance with embodiments described herein.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The description below describes an address location identifier system capable of relating a physical location to an address. As explained above, mailing addresses in rural areas do not always reflect the actual physical location of the address. For example, some rural addresses may be associated with the middle of a county or the first house on a shared street. An institution may therefore struggle to assess a property (e.g., insurance assessments), deliver documents to a physical location, among other services. The address location identifier system, in accordance with present embodiments, may therefore assist an institution by determining the physical location of a member and associate that physical location with an address by using global positioning system (GPS) data and/or other location data associated with the member.

FIG. 1 is a schematic view of an address location identifier system 10. The address location identifier system 10 includes a computer system 12. The computer system 12 may include servers and/or other computer systems capable of using different types of data to correlate an address to a physical location. The computer system 12 includes one or more processors 14, such as the illustrated microprocessor, and one or more memory devices 30. The computer system 12 may also include one or more storage devices and/or other suitable components. The processor 14 may be used to execute software, such as software that enables the address location identifier system 10 to process GPS data, picture metadata, imagery data, among others. Moreover, the processor 14 may include multiple microprocessors, one or more "general-purpose" microprocessors, one or more special-purpose microprocessors, and/or one or more application specific integrated circuits (ASICS), or some combination thereof. For example, the processor 14 may include one or more reduced instruction set (RISC) processors.

Memory device 16 may include a volatile memory, such as random access memory (RAM), and/or a nonvolatile memory, such as read-only memory (ROM). Memory device 16 may store a variety of information and may be used for various purposes. For example, memory device 16 may store processor executable instructions (e.g., firmware or software) for the processor 14 to execute. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

As illustrated, the address location identifier system 10 receives data from a variety of sources. These sources may include satellite imagery from a satellite imagery database 18, a GPS database 20 that stores GPS data from a member's vehicle, a GPS database that stores GPS data from a member's portable electronic device(s), and/or a database 24 that stores a member's picture location metadata. In operation, the address location identifier system 10 uses this information to determine a physical location of the member's residence or property (e.g., latitude and longitude) and then associates the physical location of the member's residence to the member's address. It should be understood that while multiple sources of data (e.g., databases) may be used in determining a physical location of the member's residence, a single source of data may be sufficient. However, if multiple sources of data are available the address location identifier system 10 may use all of them to confirm and/or correct the physical location of the member's residence.

Figure 2:
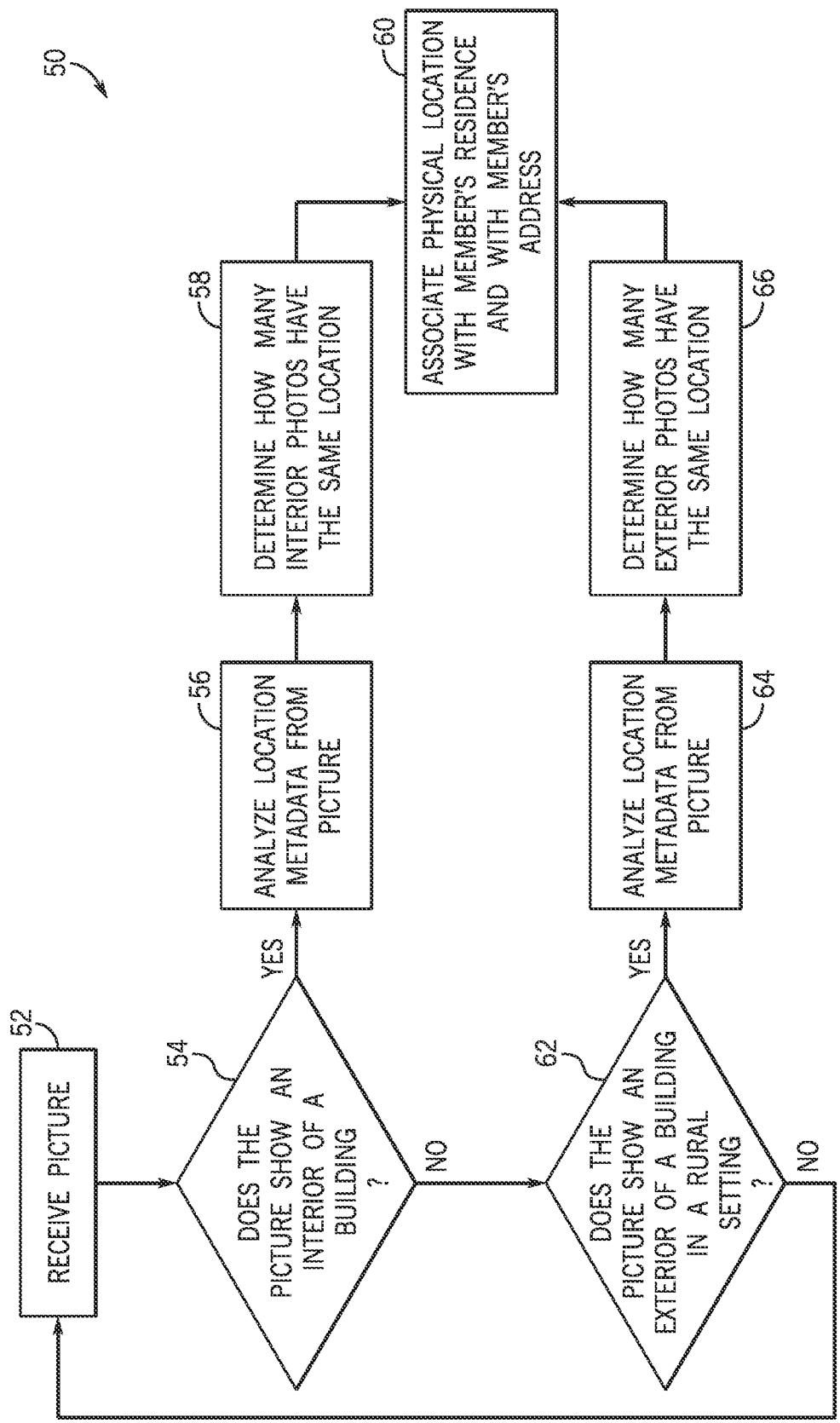
FIG. 2 is a flowchart illustrating a method for identifying and associating a physical location with a member's address from analyzing picture metadata, in accordance with embodiments described herein.

FIG. 2 is a flowchart illustrating a method 50 for identifying the physical location of the member's residence or property using the address location identifier system 10. The method 50 begins by receiving an image or picture, step 52. The image or picture may come from a variety of sources including social media (e.g., picture from the member's social media account), a communication directly from the member to the institution, among others. The computer system 12 may then analyze the picture to determine if the picture shows the interior of a building (e.g., home, apartment, office, kitchen), step 54. For example, the computer system 12 may use artificial intelligence to recognize objects and/or features associated with an interior of a building. By recognizing that the picture was taken in a building, the computer system 12 may narrow the amount of location metadata that can be associated with the physical location of the member's residence. For example, the location metadata from a picture taken in a park may not be included in the possible locations of a member's residence. If the answer is yes, the method 50 analyzes the location metadata from the picture, step 56. For example, the computer system 12 may compare the location metadata from the picture with a proximate known location of the member's residence. For example, if the member's physical location is in Texas and the image metadata is from Florida, the computer system 12 may determine that the image location metadata cannot be associated with a physical location of the member's residence. The analysis of the image metadata may be more specific than comparing states. For example, the analysis may compare the location metadata of the picture to the location of the member's county, township, among others. After analyzing the location metadata from the pictures, the computer system 12 may group the photos by location to determine a physical location of the member's residence with the assumption that the majority of the photos would likely be taken at the member's residence, step 58. The method 50 may then associate the physical location of the member's residence with the member's address, step 60.

If the picture does not show the interior of a building, the computer system 12 may then analyze the picture to determine if the picture shows the exterior of a building in a rural setting, step 62. For example, the computer system 12 may use artificial intelligence to recognize objects and/or features associated with a rural setting in combination with features of a building. By recognizing that the picture includes a rural setting in combination with the building, the computer system 12 may narrow the amount of location metadata that can be associated with the physical location of the member's residence. For example, the computer system 12 may identify a city setting in picture and therefore not include the location metadata of the picture in the possible locations of a member's residence. If the answer is yes (i.e., a rural setting and building are identified), the method 50 analyzes the location metadata from the picture, step 64, if not the method 50 returns to receiving an image, step 52. When analyzing the location metadata from the picture, the computer system 12 may compare the location metadata from the picture with a proximate known location of the member's residence. Again, an example of this may be if the member's physical location is in Texas and the image metadata is from Florida, the computer system 12 may determine that the image location metadata cannot be associated with a physical location of the member's residence. The location analysis of the image metadata may be more specific (e.g., county, township) when comparing the picture metadata to the area of the member's residence. After analyzing the location metadata from the pictures, the computer system 12 may group the photos by location to determine a physical location of the member's residence with the assumption that the majority of the photos would likely be associated with the member's residence, step 66. The method 50 may then associate the physical location of the member's residence with the member's address, step 60.

The method 50 described above analyzes the contents of the image before analyzing the location metadata from the picture. It should be understood that the method 50 may reverse the order. That is, the method 50 may first analyze the metadata from the picture to determine if the picture was taken in vicinity of the member's address. This may enable the method 50 to narrow the number of pictures that are then sorted into interior pictures (e.g., interior residence photos) and exterior pictures (e.g., exterior residence photos) for further analysis.

Figure 3:
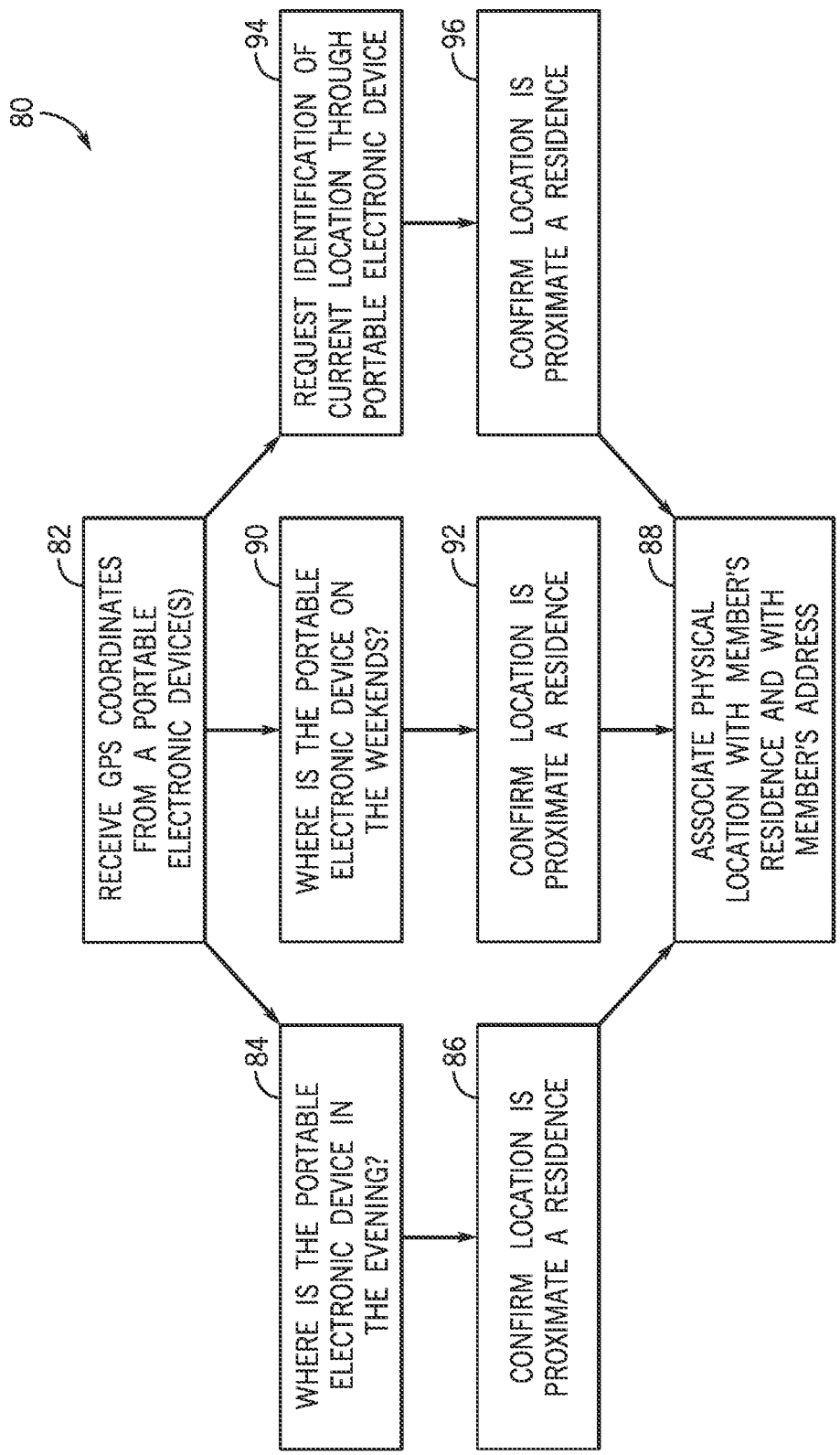
FIG. 3 is a flowchart illustrating a method for identifying and associating a physical location with a member's address from a portable electronic device's global positioning system data, in accordance with embodiments described herein.

FIG. 3 is a flowchart illustrating a method 80 for identifying and associating a physical location with a member's address from global positioning system data of a portable electronic device(s). The method 80 begins as the computer system 12 receives GPS coordinates from a portable electronic device or devices, step 82. These portable electronic devices may include cell phones, laptops, smart watches, tablets, wearable fitness devices, among others. These portable electronic devices may be associated with the member through an app (e.g., an institution's app) downloaded to the portable electronic device and/or the portable electronic device may be used to access an account at the institution. In some situations, the member may register the portable electronic device with the institution. When the member downloads the app, logs into an account, and/or registers the device with the institution the member may agree to provide access to the devices GPS system enabling the institution to receive GPS coordinates indicative of the location of the portable electronic device(s). The GPS data provided by the portable electronic device may also include timestamps indicating both the location of the portable electronic device and the time it was at that location.

Using the GPS data and timestamps, the method 80 then determines where the portable electronic device is at different times, such as in the evening, step 84. For example, method 80 may analyze the location data of the portable electronic device during the hours of 10 PM to 5 AM for a period of time (e.g., day, week, month, year). By determining the location of the portable electronic device during the evening, the method 80 may determine that this is the likely residence location of the member. In step 84, the method 80 may also compare the location data of the portable electronic device with a proximate known location of the member's residence. For example, the analysis may compare the location data of the portable electronic device to the location of the member's county, township, among others. If the GPS data is not proximate the member's address, the method 80 may change the analyzed times to determine the physical location of the member's residence.

In some embodiments, the method 80 may confirm that the location data associated with the portable electronic device is proximate a residence, step 86. For example, the computer system 12 may pull satellite imagery data to determine if a home is located at the location of the GPS data provided by the portable electronic device. If so, the method 80 may then associate the physical location of the portable electronic device with the member's address, step 88.

In some cases, members of the institution may work during the week away from his or her residence. Accordingly, the method 80 may also determine where the portable electronic device is on the weekend with the assumption that the member is home on the weekend. The method 80 may pull data from a variety of weekends for this analysis (e.g., 1 weekend, 5 weekends, 10 weekends). As explained above, the GPS data may include timestamps that enable the method 80 to determine where the portable electronic device is on the weekends, step 90. For example, the method 80 may analyze the location data of the portable electronic device from 10 PM on Friday night to Sunday at 6 PM. By determining where the portable electronic device was primarily located on the weekend, the method 80 may determine that this is the likely residence location of the member. In step 90, the method 80 may also compare the location data of the portable electronic device with a proximate known location of the member's residence. For example, the analysis may compare the location data of the portable electronic device to the location of the member's county, township, among others. If the GPS data is not proximate the member's address, the method 80 may change the analyzed times to determine the physical location of the member's residence.

As discussed above, the method 80 may confirm that the location data associated with the portable electronic device is proximate a residence, step 92. For example, the computer system 12 may pull satellite imagery data to determine if a home is located at the location of the GPS data (e.g., GPS data associated with the weekend) provided by the portable electronic device. If so, the method 80 may then associate the physical location of the portable electronic device with the member's address, step 88.

In some embodiments, the method 80 may also request identification of its current location through the portable electronic device, step 94. For example, when the member loads an institution's app or accesses member services through an institution's website, the application and/or website may request that the member identify their current location. The application and/or website may provide a list that the member may select from to provide the current location of the portable electronic device. The list may include home, work, restaurants, grocery store, among others. In some embodiments, the application website may provide a simple "yes" or "no" question regarding if they are currently at their residence. To encourage the member to answer the question, the method 80 may state that a reward will be provided if the question is answered. The method 80 may then confirm that the location data associated with the member's reply is proximate a residence, step 96. For example, the computer system 12 may pull satellite imagery data to determine if a home is located at those GPS coordinates. If so, the method 80 may then associate the physical location of the portable electronic device with the member's address, step 88.

Figure 4:
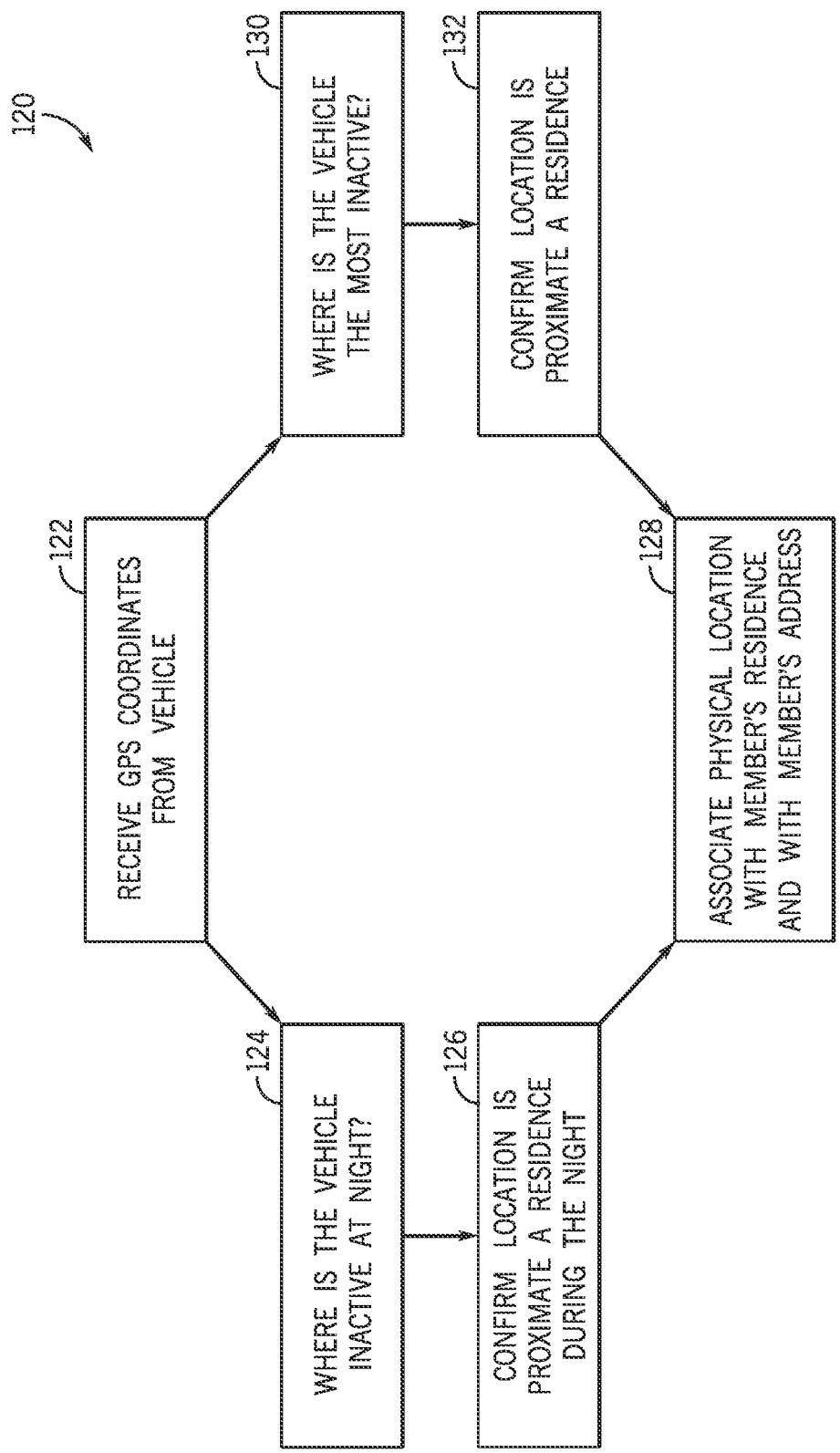
FIG. 4 is a flowchart illustrating a method for identifying and associating a physical location with a member's address from a vehicle's global positioning system data, in accordance with embodiments described herein.

FIG. 4 is a flowchart illustrating a method 120 for identifying and associating a physical location with a member's address from global positioning system data of a member's vehicle. The method 120 begins as the computer system 12 receives GPS coordinates from a vehicle (e.g., truck, car, motorcycle), step 122. The vehicle GPS data may come from the vehicle manufacturer and/or a GPS system that the institution may access. The GPS data provided may also include timestamps enabling a time-location association.

Using the GPS data and the timestamps, the method 120 then determines where the vehicle is primarily located in the evening, step 124. For example, method 120 may analyze the location data of the vehicle during the hours of 10 PM to 5 AM for a period of time (e.g., day, week, month, year). By determining the location of the vehicle during the evening, the method 120 may determine that this is the likely residence location of the member. In step 124, the method 120 may also compare the location data of the vehicle with a proximate known location of the member's residence. For example, the analysis may compare the location data of the vehicle to the location of the member's county, township, among others. If the GPS data is not proximate the member's address, the method 80 may change the analyzed times to determine the physical location of the member's residence.

In some embodiments, the method 120 may confirm that the location data associated with the vehicle is proximate a residence, step 126. For example, the computer system 12 may pull satellite imagery data to determine if a home is located at the location of the GPS data for the vehicle. If so, the method 120 may then associate the physical location of the portable electronic device with the member's residence and with the member's address, step 128.

The method 120 may also determine where the vehicle is inactive the most and/or inactive for the longest sections of time, step 130. This data may be collected with the assumption that the vehicle is inactive the most and/or for the longest sections of time when at the member's residence. The method 120 may pull this data for a variety of time periods (e.g., day, week, month, year). The method 120 may also compare the location where the vehicle is the most inactive and/or inactive for the longest amounts of time with a proximate known location of the member's residence. For example, the analysis may compare the location data of the vehicle to the location of the member's county or township.

The method 120 may again confirm that the location data associated with the vehicle is proximate a residence, step 132. For example, the computer system 12 may pull satellite imagery data to determine if a home is located at the location of the GPS data for the portable electronic device. If so, the method 120 may then associate the physical location of the portable electronic device with the member's residence and with the member's address, step 128.

In each of the embodiments discussed above (including combinations of disclosed embodiments), statistical analysis and historical data may be utilized to determine a residence location. This may include comparing data for a particular address to data confirmed for a set of addresses. For example, if historical data for confirmed addresses suggest that having a car at a particular location for at least 75% of measured evenings and with at least 50% of interior photos associated via metadata to the particular location indicates that a location is a residence for an address, then having similar statistics for an address under evaluation may increase a likelihood that the address under evaluation should be the indicated location. Artificial intelligence programs may be utilized to compare historical data and data under evaluation in accordance with present embodiments.

The technical effects of the systems and methods described herein include a computer system that associates a physical location to an address. The address location identifier system may associate a physical location with an address by accessing and analyzing GPS data from a vehicle, GPS data from a portable electronic device(s), and/or picture location metadata.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method for determining a physical location for an address, the method comprising:
receiving, via a processing system, a first set of positioning data indicative of a vehicle location from a positioning system configured to monitor a vehicle;
receiving, via the processing system, a second set of positioning data indicative of a mobile device location from the positioning system or an additional positioning system configured to monitor a mobile device;

receiving, via the processing system, location metadata associated with a picture;

identifying a correlation of the location metadata with the first set of positioning data and the second set of positioning data; and in response to identifying the correlation, determining, via the processing system, the physical location of the address based on the first set of positioning data, the second set of positioning data, and the location metadata.

2. The method of claim 1, comprising:

identifying, via the processing system, one or more objects in the picture and known to be associated with the address; and using the location metadata to identify the correlation based on the picture including the one or more objects known to be associated with the address.

3. The method of claim 2, wherein the one or more objects are known to be associated with the address as one or more personals objects of a known resident of the address.

4. The method of claim 1, comprising:

receiving, via the processing system, the address as an input; and determining, via the processing system, a proximate location associated with the address, wherein the proximate location comprises a state, a township, a country, or any combination thereof.

5. The method of claim 4, comprising:

comparing, via the processing system, the location metadata and the proximate location; and determining, via the processing system, the physical location of the address based on a match between the location metadata and the proximate location.

6. The method of claim 4, comprising:

comparing, via the processing system, a first location within the first set of positioning data at a first time and the proximate location;

based on a mismatch of the first location and the proximate location, comparing, via the processing system, a second location within the first set of positioning data at a second time different from the first time and the proximate location; and determining, via the processing system, the physical location of the address based on the second location corresponding to the proximate location.

7. The method of claim 6, comprising:

determining, via the processing system, a subset of data within the first set of positioning data indicative of the vehicle being stationary and selecting the first location and the second location from the subset of data.

8. The method of claim 1, comprising:

receiving, via the processing system, a plurality of pictures from a social media site, the mobile device, or both;

determining, via the processing system, a respective set of location metadata associated with each picture of the plurality of pictures;

grouping, via the processing system, each picture of the plurality of pictures based on the respective set of location metadata;

identifying, via the processing system, one or more objects within each picture of the plurality of pictures; and grouping, via the processing system, each picture of the plurality of pictures based on the one or more objects.

9. The method of claim 1, comprising:

receiving, via the processing system, satellite imagery corresponding to the physical location of the address based on a match between the first set of positioning data and the second set of positioning data; and confirming, via the processing system, a property at the physical location of the address.

10. A method for physical location assessment of an address, the method comprising:

receiving, via a processing system, a set of positioning data indicative of positions of a vehicle at associated times, wherein the vehicle is associated with the address;

selecting a subset of positioning data from the set of positioning data, wherein the subset of positioning data is selected based on being associated with evening times and/or a weekend; and selecting one or more physical locations indicated by the subset of positioning data that falls within a proximate location associated with the address; and assigning a physical location to the address based on the one or more physical locations.

11. The method of claim 10, comprising:

receiving, via the processing system, a second set of positioning data indicative of a mobile device location; and confirming, via the processing system, the physical location based on detecting a correspondence between the second set of positioning data and the one or more physical locations.

12. The method of claim 10, comprising:

receiving, via the processing system, satellite data corresponding to the set of positioning data;

determining, via the processing system, one or more objects within the satellite data, wherein the one or more objects comprises a house; and confirming, via the processing system, the physical location based on the satellite data.

13. The method of claim 10, comprising selecting the subset of positioning data from the set of positioning data based on determining whether a continuous amount of time at a particular location exceeds a threshold amount of time.

14. The method of claim 10, wherein the vehicle is associated with the address based on data for an individual being associated with the address and the vehicle.

15. A method for determining a physical location for an address, the method comprising:

receiving, via a processing system, a set of positioning data indicative of a vehicle location from a positioning system of a vehicle, wherein the set of positioning data is associated with an evening time frame and the vehicle is associated with the address;

receiving, via the processing system, a picture and determining that the picture is associated with the address;

receiving, via the processing system, a set of location metadata associated with the picture; and determining, via the processing system, the physical location of the address based on the set of global positioning data and the set of location metadata.

16. The method of claim 15, comprising:

identifying, via the processing system, imagery within the picture representative of an interior of a building associated with the address to determine that the picture is associated with the address.

17. The method of claim 15, comprising:
receiving, via the processing system, a second set of location metadata associated with a second picture;
receiving, via the processing system, the address comprising a state, a township, a city, a street, or any combination thereof; and
excluding the second set of location metadata from use in determining the physical location based on determining, via the processing system, the second set of location metadata is not proximate the address and.

18. The method of claim 15, comprising:
receiving, via the processing system, a second set of positioning data indicative of a mobile device location; and
determining, via the processing system, a physical location of the address based on the second set of positioning data.

19. The method of claim 18, comprising:
instructing, via the processing system, a display of a mobile device to prompt input of a category corresponding to the mobile device location; and
confirming, via the processing system, the physical location of the address based on receiving an indication of the selected category being home.

20. The method of claim 15, comprising:
receiving, via the processing system, satellite data corresponding to the set of positioning data;
determining, via the processing system, one or more objects within the satellite data, wherein the one or more objects comprises a house; and
receiving the set of positioning data in response to determining the one or more objects within the satellite data.

* * * * *